United States Patent Office
3,387,051
Patented June 4, 1968

3,387,051
METHOD OF PREPARATION OF SUBSTITUTED ARYL ETHANE COMPOUNDS
John R. Norell, Bartlesville, Okla., assignor to Phillips Petroleum Company, a corporation of Delaware
No Drawing. Filed Oct. 22, 1965, Ser. No. 502,631
8 Claims. (Cl. 260—668)

ABSTRACT OF THE DISCLOSURE

Substituted aryl ethane compounds are formed by contacting alkenyl-substituted cycloalkenes with a palladium or palladium supported catalyst.

---

This invention relates to a method of preparation of substituted aryl ethane compounds. In one aspect this invention relates to a method for preparing bibenzyl. In another aspect this invention relates to a method for preparing 1-phenyl-2-cyclohexylethane.

In a copending case of D. L. Crain (Ser. No. 502,544, filed Oct. 22, 1965), which is assigned to a common assignee Phillips Petroleum Company, Bartlesville, Okla., there is described a novel method for the preparation of a novel compound 1,2-bis(3-cyclohexen-1-yl)ethylene by contacting 4-vinylcyclohexene with a supported molybdenum catalyst.

It is an object of this invention to provide a method for converting 1,2-bis(3-cyclohexen-1-yl)ethylene and methyl and ethyl substituted derivatives thereof to other useful hydrocarbons.

It is another object of this invention to provide a method for converting 1,2-bis(3-cyclohexen-1-yl)ethylene to 1-phenyl-2-cyclohexylethane and/or bibenzyl by contact with a supported metal selected from the group consisting of palladium and platinum.

Other objects and many of the attendant advantages of this invention will be readily appreciated as the same become understood by reference to the following detailed description.

The present invention contemplates either the isomerization of 1,2-bis(3-cyclohexen-1-yl)ethylene to 1-phenyl-2-cyclohexylethane or the dehydrogenation of this compound to bibenzyl.

Examples of suitable 1,2-bis(3-cyclohexen-1-yl)ethylenes which are employed in the practice of this invention are characterized by the formula

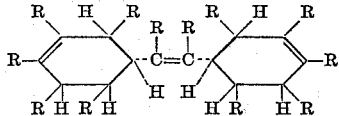

where R is at least one member selected from the group consisting of hydrogen and methyl and ethyl radicals, the total number of carbon atoms in all of said R groups preferably being not greater than 8:

1,2-bis(3-cyclohexen-1-yl)ethylene
1,2-bis(2-methyl-3-cyclohexen-1-yl)ethylene
1,2-bis(4-ethyl-3-cyclohexen-1-yl)ethylene
1,2-bis(4-methyl-3-cyclohexen-1-yl)ethylene
1,2-bis(5-ethyl-3-cyclohexen-1-yl)ethylene
1,2-bis(6-methyl-3-cyclohexen-1-yl)ethylene
3,4-bis(3-cyclohexen-1-yl)-3-hexene
1,2-bis(2,6-dimethyl-3-cyclohexen-1-yl)ethylene
2,3-bis(3-methyl-3-cyclohexen-1-yl)2-butene
2,3-bis(4-methyl-3-cyclohexen-1-yl)-2-butene
1,2-bis(5,6-dimethyl-3-cyclohexen-1-yl)ethylene
1,2-bis(2,5,6-trimethyl-3-cyclohexen-1-yl)ethylene
1,2-bis(2,6-diethyl-3-cyclohexen-1-yl)ethylene
3,4-bis(4-ethyl-3-cyclohexen-1-yl)-3-hexene
1-(3-methyl-3-cyclohexen-1-yl)-2-(2-methyl-6-ethyl-3-cyclohexen-1-yl)-ethylene
1-(3-cyclohexen-1-yl)-2-(2-methyl-3-cyclohexen-1-yl)ethylene In relative terms, the isomerization reaction is favored by somewhat lower temperatures than are best for the dehydrogenation reaction.

The catalyst necessary to effect either of these reactions is limited to either a supported platinum or palladium material. These catalysts can be supported on a wide variety of materials including such supports as charcoal, kieselguhr, alumina, silica-alumina, and the like. The amount of active metal in such supported catalyst can vary over a wide range, but would usually fall within the range of from 1–20 percent by weight active metal based on the total weight of metal and support.

As discussed hereinabove, depending upon the reaction temperature employed, the process of this invention can be utilized to form either 1-phenyl-2-cyclohexylethane or bibenzyl as the major product. The conversion process of this invention is carried out at a temperature generally ranging from 150–500° C. If 1-phenyl-2-cyclohexylethane is desired as the predominant product, the reaction temperature will usually not exceed 175° C. If bibenzyl is desired as the predominant product, it is preferred to operate at a temperature of at least 250° C. However, it is to be recognized that reactions effected at temperatures ranging from 175–250° C. will yield substantial quantities of both products.

Likewise the reaction times can vary over a wide range of from a few minutes to as high as 24 hours, but will more usually range from about 10 minutes to as high as 5 hours. When it is desired to prepare 1-phenyl-2-cyclohexylethane, reaction times will usually be less than 1 hour at the described temperatures.

The reaction can be carried out batchwise or continuously using conventional techniques. If batchwise operation is employed, and such is currently preferred, the amount of supported catalyst present will usually range from 0.5–10 percent by weight of the 1,2-bis(3-cyclohexen-1-yl)ethylene.

It is also within the scope of this invention to employ a diluent. It is preferred to employ a diluent whose atmospheric boiling point coincides with the temperature at which the conversion is to be effected. By operating in this fashion, control of temperature can be maintained, and the possibility of temperature surges is minimized. Specific examples of diluents which can be employed in the carrying out of this process are n-nonane, xylene, tetralin, n-dodecane, and other paraffins, isoparaffins and aromatics which boil in the range from 150–500° C.

Examples of 1-phenyl-2-cyclohexylethanes produced as described hereinabove are characterized by the formula:

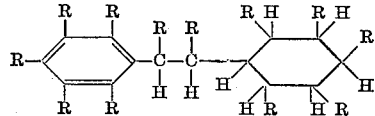

1-phenyl-2-cyclohexylethane
1-o-tolyl-2-(2-methylcyclohexyl)ethane
1-(3-ethylphenyl)-2-(3-ethylcyclohexyl)ethane
1-p-tolyl-2-(4-methylcyclohexyl)ethane
3-phenyl-4-cyclohexylhexane
1-(2,6-xylyl)-2-(2,6-dimethylcyclohexyl)ethane
2-m-tolyl-3-(3-methylcyclohexyl)butane
2-p-tolyl-3-(4-methylcyclohexyl)butane
1-(2,3-xylyl)-2-(2,3-dimethylcyclohexyl)ethane
1-(2,3,6-trimethylphenyl)-2-(2,3,6-trimethylcyclohexyl)ethane
1-(2,6-diethylphenyl)-2-(2,6-diethylcyclohexyl)ethane
3-(4-ethylphenyl)-4-(4-ethylcyclohexyl)hexane 1-m-tolyl-2-(2-methyl-6-ethylcyclohexyl)ethane
1-(2-methyl-6-ethylphenyl)-2-(3-methylcyclohexyl)ethane
1-o-tolyl-2-cyclohexylethane Examples of bibenzyl compounds produced as described hereinabove are characterized by the formula:

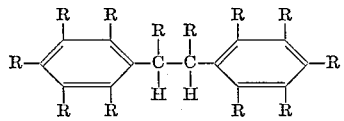

bibenzyl
2,2'-dimethylbibenzyl
3,3'-diethylbibenzyl
4,4'-dimethylbibenzyl
α,α'-diethylbibenzyl
2,2',6,6',-tetramethylbibenzyl
α,α',3,3'-tetramethylbibenzyl
α,α',4,4'-tetramethylbibenzyl
2,2',3,3'-tetramethylbibenzyl
2,2',3,3',6,6'-hexamethylbibenzyl
2,2',6,6'-tetraethylbibenzyl
α,α',4,4'-tetraethylbibenzyl
2,3'-dimethyl-6-ethylbibenzyl
2-methylbibenzyl The products of the process of this invention are useful for a variety of purposes such as insecticides, fungicides, and the like.

Without intending to limit the scope of the invention thereto, the present invention will be illustrated hereinafter by the following examples:

Example I

A run was carried out in which 1,2-bis(3-cyclohexen-1-yl)ethylene was converted to bibenzyl according to the process of this invention.

In this run, 5 grams of 1,2-bis(3-cyclohexen-1-yl)ethylene (BCE) and approximately 0.3 gram of commercial 10 percent by weight palladium on charcoal were charged to a 35 ml. flask fitted with a condenser and attached to a gas measuring tube. The mixture was then heated by placing the flask containing the mixture in a Wood's metal bath. At approximately 180° C., evolution of gas occurred. The temperature was gradually raised to 250–260° C., where it was held for one hour, during which time hydrogen evolution proceeded smoothly. A total of approximately 1200 ml. of gas was collected during this period. The temperature was finally raised rapidly to 300° C., and the mixture was then allowed to cool. During the total reaction time, approximately 3.6 mols of hydrogen was collected.

The residue was a clear, uncolored liquid which after standing over a weekend had crystallized to long, white needles. The mixture was dissolved in n-pentane and the solution was filtered to remove the catalyst. The n-pentane was then evaporated until a total volume of 50 ml. was obtained. A solid crystallized from this solution yielding 2.62 grams of white needles, melting point 48–51° C. After separating the crystals by filtration, the filtrate was further evaporated to yield an additional 0.60 gram of crystals. The crystals were very soluble in n-pentane and ethyl alcohol. These crystals were identified as bibenzyl by comparison with an infrared spectrum of an authentic sample of bibenzyl. A comparison of melting points also confirmed this material as bibenzyl. The melting point of pure bibenzyl is 51.5–53° C., while the melting point of the above prepared material, after recrystallization from n-pentane, was also 51.5–53° C. There was no depression of the mixed melting point. The yield of bibenzyl was 63.5 percent based on the BCE charged.

Example II

A run was carried out by essentially the same procedure as in Example I except that the conversion was carried out in xylene diluent and the reaction mixture was heated with an electric mantle.

In this run, 10 grams of BCE, 0.75 gram of 10 percent by weight palladium on charcoal and 30 ml. of xylene were heated slowly to 145° C. It required 13 minutes and 45 seconds to heat the mixture from 80° C. to 145° C., and the mixture was then maintained for 91 minutes and 15 seconds at 145–148° C. The heat was then turned off, and the mixture was allowed to cool while standing over a weekend. The catalyst was then removed by filtration, and the remaining solution was analyzed by gas-liquid chromatography using an 8 foot 20 percent Carbowax column operating at 225° C., being thereby shown to contain 14.2 weight percent bibenzyl and 73.5 weight percent 1-phenyl-2-cyclohexylethane.

Example III

A run was carried out in which 10 grams of BCE and 0.20 gram of the catalyst of Examples I and II were heated to 268° C. It required 17 minutes to reach 210° C., 10 minutes between 210 and 230° C., 4.5 minutes from 230 to 240° C., 58.5 minutes from 240 to 257° C. and 90 minutes from 257 to 268° C. Steady gas evolution began at 240° C. and 1602 ml. of hydrogen were evolved during the total reaction time. After cooling overnight, the residue solidified and this mixture was recrystallized from n-pentane. After filtering the solution to remove the catalyst, the mixture was analyzed by gas-liquid chromatography as described in Example II. This analysis gave the following results:

| Component: | Wt. percent |
|---|---|
| 1-phenyl-2-cyclohexylethane | 29.7 |
| Bibenzyl | 61.3 |
| Unidentified residue | 9.0 |

Example IV

A run was carried out wherein BCE was converted to bibenzyl using a supported palladium catalyst. The catalyst used in this run was palladium on alumina.

In this run, 16.6 grams (0.1 mole) of BCE and 3.0 grams of 0.5 weight percent palladium on alumina were heated until the temperature reached 235° C. At this temperature a sudden release of hydrogen occurred. After 8 more minutes, the temperature was 247° C. at which temperature a steady evolution of hydrogen was observed. Another 142 minutes was required to reach 265° C. After reaching 265° C., the heat was turned off and the reactiton was allowed to cool. A total of 2850 ml. of hydrogen had evolved. The reaction mixture was then cooled in a refrigerator to a temperature of approximately 0° C., and the reaction mixture solidified. A n-pentane solution of this material was analyzed by chromatography, using the method of the previous example. The reaction mixture contained 10.3 weight percent of an unidentified component, 33.8 weight percent of 1-phenyl-2-cyclohexylethane and 56 weight percent of bibenzyl.

Example V

A run was carried out by the process of this invention in which BCE was converted to 1-phenyl-2-cyclohexylethane.

In this run, 18.8 grams of BCE, 0.3 gram of the catalyst of Example I and 35 ml. of n-nonane were heated in the following manner. The catalyst and nonane were charged to a flask fitted with a heating mantle, and the BCE, diluted with 10 ml. of additional n-nonane, was added dropwise to the catalyst mixture at 150° C. After 45 minutes, the temperature had risen from 145 to 162° C. The reaction mixture was then cooled, the catalyst was filtered off and the n-nonane was distilled from the filtrate. The residue was then vacuum distilled on a 7 inch Vigreaux column. The details of this fractionation are given below as a table.

| Fraction | Temperature, °C. | Pressure, mm. Hg | Volume, ml. | $n_D^{20}$ |
|---|---|---|---|---|
| 1 | 82 | 0.5 | 6.8 | Not meas. |
| 2 | 82–84 | 0.5 | 5.5 | Not meas. |
| 3 | 84 | 0.5 | 2.6 | 1.5154 |
| 4 | 84–87 | 0.5 | 2.8 | 1.5175 |

Cuts 1, 2 and 3 were combined and were analyzed by GLC and found to contain 67.2 weight percent of 1-phenyl-2-cyclohexylethane and 15 weight percent bibenzyl. Cut 4 was found to contain 72.6 weight percent of 1-phenyl-2-cyclohexylethane and 17.3 weight percent of bibenzyl. By means of a Carbowax preparatory chromatographic column a pure sample of 1-phenyl-2-cyclohexylethane was obtained from cut 4. The infrared spectrum of this material was superimposable with that of an authentic specimen of 1-phenyl-2-cyclohexylethane. Analysis of this material by mass spectroscopy yielded a cracking pattern identical with the pattern of 1-phenyl-2-cyclohexylethane.

Variations and modifications of materials and conditions may be made in the foregoing examples as will be obvious to those skilled in the art without departing from the scope of the present invention.

It is intended that the patent shall cover by suitable expression in the appended claims the features of patentable novelty which reside in the invention.

I claim:
1. A method for preparing substituted arylethane compounds, said compounds being selected from the group consisting of those compounds characterized by the following formulas:

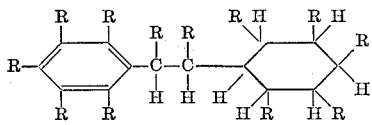

and

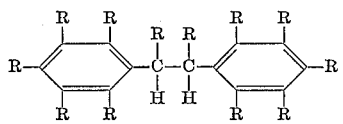

wherein R is selected from the group consisting of hydrogen, methyl, ethyl, said method comprising the step of contacting a compound characterized by the formula:

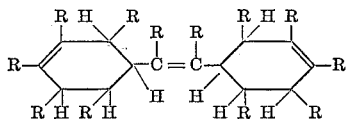

wherein R is as defined above with a supported metal catalyst comprising a metal selected from the group consisting of platinum and palladium supported upon a material selected from the group consisting of charcoal, kieselguhr, alumina, and silica-alumina at a temperature ranging from 150–500° C.

2. A method for producing 1-phenyl-2-cyclohexylethane comprising the steps of contacting 1,2-bis(3-cyclohexen-1-yl)ethylene with a catalyst consisting essentially of platinum supported on charcoal wherein the weight of platinum falls within the range of from 1 to 20 percent by weight of the catalyst at a temperature of 150–175° C.

3. A method for producing bibenzyl comprising the steps of contacting 1,2-bis(3-cyclohexen-1-yl)ethylene with a catalyst consisting essentially of palladium supported on alumina wherein the amount of palladium ranges from 1 to 20 percent by weight of the catalyst at a temperature ranging from 250–500° C. and recovering the bibenzyl product formed thereby.

4. A method according to claim 3 wherein the amount of catalyst present ranges from 0.5 to 10 percent by weight of the 1,2-bis(3-cyclohexen-1-yl)ethylene.

5. A method according to claim 3 wherein the 1,2-bis(3-cyclohexen-1-yl)ethylene is contacted with said catalyst in the presence of a diluent selected from the group consisting of n-nonane, xylene, tetralin, n-dodecane.

6. A method according to claim 5 wherein the diluent is xylene.

7. A method according to claim 2 wherein the 1,2-bis(3-cyclohexen-1-yl)ethylene is contacted with said catalyst in the presence of a diluent selected from the group consisting of n-nonane, xylene, tetralin, n-dodecane.

8. A method according to claim 7 wherein the diluent is n-nonane.

References Cited
UNITED STATES PATENTS

| | | | |
|---|---|---|---|
| 3,071,629 | 1/1963 | White et al. | 260—668 |
| 3,092,672 | 6/1963 | Klass | 260—668 |
| 3,228,992 | 1/1966 | Myers | 260—668 |

DELBERT E. GANTZ, *Primary Examiner.*

PAUL M. COUGHLAN, JR., *Examiner.*

C. R. DAVIS, *Assistant Examiner.*